(12) United States Patent
Jiang et al.

(10) Patent No.: US 11,019,616 B2
(45) Date of Patent: May 25, 2021

(54) METHOD AND DEVICE IN UE AND NETWORK EQUIPMENT FOR WIRELESS COMMUNICATION

(71) Applicant: Shanghai Langbo Communication Technology Company Limited, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 76 days.

(21) Appl. No.: 16/164,763

(22) Filed: Oct. 18, 2018

(65) Prior Publication Data
US 2019/0124636 A1    Apr. 25, 2019

(30) Foreign Application Priority Data

Oct. 21, 2017    (CN) .......................... 201710988315.5
Jul. 16, 2018    (CN) .......................... 201810775700.6

(51) Int. Cl.
*H04W 72/04*    (2009.01)
*H04W 68/02*    (2009.01)
(Continued)

(52) U.S. Cl.
CPC ......... *H04W 72/044* (2013.01); *H04W 68/02* (2013.01); *H04W 4/70* (2018.02);
(Continued)

(58) Field of Classification Search
CPC ... H04W 72/044; H04W 68/02; H04W 48/10; H04W 76/40; H04W 4/70; H04W 92/10; H04W 48/16; H04W 88/02; H04W 64/00
See application file for complete search history.

(56) References Cited

U.S. PATENT DOCUMENTS 10,455,487 B2 *  10/2019  Wong .................... H04L 5/0053
2018/0176792 A1 *  6/2018  Egner ................... H04W 24/02
(Continued)

FOREIGN PATENT DOCUMENTS

WO    WO-2017051740 A1 *  3/2017  ............ H04W 48/12

*Primary Examiner* — Brian T O Connor
(74) *Attorney, Agent, or Firm* — Maschoff Brennan

(57) ABSTRACT

The present disclosure provides a method and a device in a User Equipment (UE) and a network equipment for wireless communication. The UE first determines a first time-frequency resource subset from a first time-frequency resource set, and then monitors a first radio signal in the first time-frequency resource subset; wherein location relevant information of the UE is used for determining the first time-frequency resource subset from the first time-frequency resource set, and the first radio signal includes paging relevant information. According to the present disclosure, a relationship is established between the time-frequency resources transmitting the paging relevant information of the UE and the location relevant information of the UE, thus, when a Non-Terrestrial Network (NTN) base station covers an enormous number of UEs, collision problems of paging information caused by the UEs all sharing one paging scheme are avoided and waste of receiving power of the UE is avoided.

20 Claims, 11 Drawing Sheets

(51) Int. Cl.
*H04W 88/02* (2009.01)
*H04W 64/00* (2009.01)
*H04W 48/10* (2009.01)
*H04W 76/40* (2018.01)
*H04W 4/70* (2018.01)
*H04W 92/10* (2009.01)
*H04W 48/16* (2009.01)

(52) U.S. Cl.
CPC ............ *H04W 48/10* (2013.01); *H04W 48/16* (2013.01); *H04W 64/00* (2013.01); *H04W 76/40* (2018.02); *H04W 88/02* (2013.01); *H04W 92/10* (2013.01)

(56) References Cited

U.S. PATENT DOCUMENTS

| | | | | |
|---|---|---|---|---|
| 2018/0279267 A1* | 9/2018 | Yasukawa | ............ | H04W 48/12 |
| 2019/0053140 A1* | 2/2019 | Wong | .................... | H04W 48/16 |
| 2019/0159167 A1* | 5/2019 | Wong | .................... | H04W 4/70 |
| 2019/0357185 A1* | 11/2019 | Kwak | .................... | H04L 5/0053 |
| 2019/0394707 A1* | 12/2019 | Wong | .................... | H04W 4/06 |

\* cited by examiner

METHOD AND DEVICE IN UE AND NETWORK EQUIPMENT FOR WIRELESS COMMUNICATION

CROSS REFERENCE TO RELATED APPLICATION

This application claims the priority benefit of Chinese Patent Application Serial Number 201710988315.5, filed on Oct. 21, 2017, and 201810775700.6, filed on Jul. 16, 2018, the full disclosure of which is incorporated herein by reference.

BACKGROUND

Technical Field

The present disclosure relates to transmission methods and devices in wireless communication systems, and in particular to a transmission method and device for radio signals with long transmission delays.

Related Art

At present, the study item to support Non-Terrestrial Networks (NTNs) in 5G New Radio Access Technology (NR) has been discussed in the 3rd Generation Partner Project (3GPP) Radio Access Network (RAN). In NTN discussions, one important scenario is that a terrestrial terminal accesses a spaceborne vehicle directly for communication. The spaceborne vehicle includes one or more of Geostationary Earth Orbiting (GEO) satellite, Medium Earth Orbiting (MEO) satellite, Low Earth Orbit (LEO) satellite, Highly Elliptical Orbiting (HEO) satellite, and Airborne Platform.

In transmission schemes of paging information in existing systems, a User Equipment (UE) calculates a Paging Frame (PF) and a Paging Occasion (PO) according to Discontinuous Reception (DRX) configurations, its own International Mobile Subscriber Identification Number (IMSI) and base station configuration information, and searches for paging relevant information in the PO corresponding to the PF. All UEs under the coverage of one base station employ one same paging mechanism, and time domain positions of the PF and the PO are related to the DRX configurations and the IMSI of the UE only. In NTN application scenarios, a highly orbiting spaceborne vehicle covers an enormous number of users. If one spaceborne vehicle corresponds to one base station, obviously the above paging mechanism will cause a large number of UEs to search for paging information in one same PF/PO, thereby bringing collisions and unnecessary power loss.

SUMMARY

In conventional paging transmission schemes, UEs which are configured with the same DRX periodicity and whose IMSIs modulo 1024 are the same search for paging relevant information in one same PF/PO. Since each base station has a limited coverage, the number of UEs, under the coverage of each base station, which search for paging relevant information in one same PF/PO is limited. Therefore, collision problems of paging information do not appear. However, as for Non-Terrestrial Network (NTN) base stations, one NTN base station covers a very large terrestrial area, and thus covers an enormous number of UEs. When an NTN base station transmits paging relevant information to all UEs under the coverage of the NTN base station, the conventional paging scheme will lead to two problems as follows.

Problem 1: a large number of UEs search for paging information in the same PF and PO, which results in collisions of paging information and affects performance.

Problem 2: some UE cannot detect its own paging information due to collisions, though it monitors the paging information for a long time. Unnecessary power consumption is caused.

In view of the above design, the present disclosure provides a solution. The embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication, wherein the method includes:

determining a first time-frequency resource subset from a first time-frequency resource set; and monitoring a first radio signal in the first time-frequency resource subset.

Herein, location relevant information of the UE is used for determining the first time-frequency resource subset from the first time-frequency resource set, and the first radio signal includes paging relevant information.

In one embodiment, the above method has the following benefits: a relationship is established between the location relevant information of the UE and the first time-frequency resource subset. The first time-frequency resource set corresponds to all time-frequency resources, used to transmit paging information, of one NTN base station. However, the UE only receives the paging information on partial time-frequency resources that are related to the location of the UE. The problem of paging collision caused by the NTN base station serving too many users is avoided.

In one embodiment, the above method has another benefit as follows: the UE does not need to monitor paging information on all time-frequency resources, transmitting paging information, of one NTN base station. The power consumption of the UE is reduced.

In one embodiment, the above method has yet another benefit as follows: the first time-frequency resource set is divided into K candidate time-frequency resource subsets, the first time-frequency resource subset is one of the K candidate time-frequency resource subsets, and the first time-frequency resource subset is related to the received location information of the UE; and, through the above method, the time-frequency resources, used to transmit paging information, in one NTN base station are grouped according to geographical locations of UEs, which improves the paging efficiency and is beneficial for the tracking of the UEs.

According to one aspect of the present disclosure, the above method includes:

determining a second time-frequency resource subset; and monitoring the first radio signal in the second time-frequency resource subset.

Herein, the second time-frequency resource subset is unrelated to the location relevant information of the UE.

In one embodiment, the above method has the following benefits: the second time-frequency resource subset is a fallback scheme for the first time-frequency resource subset, to ensure that the UE can still receive the paging information when not correctly acquiring the location relevant information.

According to one aspect of the present disclosure, the above method includes:

receiving first information.

Herein, the first information is used for determining the location relevant information of the UE.

In one embodiment, the above method has the following benefits: a network side provides location relevant information for the UE, to ensure the accuracy of the location relevant information, thereby guaranteeing that the UE determines the first time-frequency resource subset from the first time-frequency resource set correctly.

According to one aspect of the present disclosure, the above method includes:

receiving second information.

Herein, the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the UE is related to a first list, and the first list is one of the K first-type lists; the location relevant information of the UE is used for determining the first list from the K first-type lists, and the first list is used for determining the first time-frequency resource subset from the K candidate time-frequency resource subsets.

In one embodiment, the above method has the following benefits: a network side groups cells under one or more NTN base stations, and makes different cell groups correspond to different first-type lists, thereby helping the UE determine the first time-frequency resource subset from the first time-frequency resource set.

According to one aspect of the present disclosure, the above method is characterized in that: the first time-frequency resource set corresponds to all time-frequency resources, used to transmit paging information, of a transmitter of the first radio signal.

In one embodiment, the above method has the following benefits: all of the UEs served by one NTN base station search for paging information in the first time-frequency resource set.

According to one aspect of the present disclosure, the above method includes:

receiving third information.

Herein, the third information is used for determining at least the first time-frequency resource set in the first time-frequency resource set and the second time-frequency resource subset.

In one embodiment, the above method has the following benefits: an NTN base station configures, through the third information, time-frequency resources used to transmit paging relevant information for served UEs, so as to improve the flexibility of the configuration of the time-frequency resources transmitting paging relevant information.

According to one aspect of the present disclosure, the above method is characterized in that: the first time-frequency resource set includes K candidate time-frequency resource subsets, and the first time-frequency resource subset is one of the K candidate time-frequency resource subsets; and the first time-frequency resource set is related to a first antenna port, and the location relevant information of the UE is used for determining the first time-frequency resource subset from the K candidate time-frequency resource subsets.

In one embodiment, the above method has the following benefits: the first time-frequency resource set is related to the first antenna port; and, when one NTN base station includes multiple antenna ports, through spatial multiplexing, paging relevant information of UEs under the coverage of different antenna ports is simultaneously transmitted in the first time-frequency resource set, so as to save the overhead of the time-frequency resources used for transmitting paging relevant information.

In one embodiment, the above method has another benefits as follows: as for UEs, when one UE searches out a synchronization or broadcast signal on the first antenna port using a given spatial receiving parameter, the UE will search for paging relevant information on the first antenna port using the given spatial receiving parameter, so as to reduce the complexity of the UE receiving paging relevant information.

The present disclosure provides a method in a network equipment for wireless communication, wherein the method includes:

determining a first time-frequency resource subset from a first time-frequency resource set; and transmitting a first radio signal in the first time-frequency resource subset, or transmitting a first radio signal in a second time-frequency resource subset.

Herein, the first time-frequency resource set includes the first time-frequency resource subset, a receiver of the first radio signal includes a first terminal, location relevant information of the first terminal is used for determining the first time-frequency resource subset from the first time-frequency resource set, and the first radio signal includes paging relevant information.

In one embodiment, the network equipment is an MME corresponding to the first terminal.

In one embodiment, the network equipment is a base station, and the base station is a maintenance base station for a serving cell of the first terminal.

In one embodiment, the network equipment is an NTN base station.

In one embodiment, the network equipment is a terrestrial network base station.

In one subembodiment, the first terminal is connected to the terrestrial network base station and an NTN base station simultaneously.

According to one aspect of the present disclosure, the above method includes:

determining the second time-frequency resource subset.

Herein, the second time-frequency resource subset is unrelated to the location relevant information of the first terminal.

According to one aspect of the present disclosure, the above method includes:

transmitting first information.

Herein, the first information is used for determining the location relevant information of the first terminal.

According to one aspect of the present disclosure, the above method includes:

transmitting second information.

Herein, the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the first terminal is related to a first list, and the first list is one of the K first-type lists; the location relevant information of the first terminal is used for determining the first list from the K first-type lists, and the first list is used for determining the first time-frequency resource subset from the K candidate time-frequency resource subsets.

According to one aspect of the present disclosure, the above method is characterized in that: the first time-frequency resource set corresponds to all time-frequency resources, used to transmit paging information, of the network equipment.

According to one aspect of the present disclosure, the above method includes:

transmitting third information.

Herein, the third information is used for determining at least the first time-frequency resource set in the first time-frequency resource set and the second time-frequency resource subset.

According to one aspect of the present disclosure, the above method is characterized in that: the first time-frequency resource set includes K candidate time-frequency resource subsets, and the first time-frequency resource subset is one of the K candidate time-frequency resource subsets; and the first time-frequency resource set is related to a first antenna port, and the location relevant information of the first terminal is used for determining the first time-frequency resource subset from the K candidate time-frequency resource subsets.

The present disclosure provides a UE for wireless communication, wherein the UE includes:

a first receiver module, to determine a first time-frequency resource subset from a first time-frequency resource set; and a second receiver module, to monitor a first radio signal in the first time-frequency resource subset.

Herein, location relevant information of the UE is used for determining the first time-frequency resource subset from the first time-frequency resource set, and the first radio signal includes paging relevant information.

In one embodiment, the above UE for wireless communication is characterized in that: the first receiver module further determines a second time-frequency resource subset, and the second receiver module further monitors the first radio signal in the second time-frequency resource subset; and the second time-frequency resource subset is unrelated to the location relevant information of the UE.

In one embodiment, the above UE for wireless communication is characterized in that: the first receiver module further receives first information, and the first information is used for determining the location relevant information of the UE.

In one embodiment, the above UE for wireless communication is characterized in that: the first receiver module further receives second information; the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the UE is related to a first list, and the first list is one of the K first-type lists; the location relevant information of the UE is used for determining the first list from the K first-type lists, and the first list is used for determining the first time-frequency resource subset from the K candidate time-frequency resource subsets.

In one embodiment, the above UE for wireless communication is characterized in that: the first time-frequency resource set corresponds to all time-frequency resources, used to transmit paging information, of a transmitter of the first radio signal.

In one embodiment, the above UE for wireless communication is characterized in that: the first receiver module further receives third information; and the third information is used for determining at least the first time-frequency resource set in the first time-frequency resource set and the second time-frequency resource subset.

In one embodiment, the above UE for wireless communication is characterized in that: the first time-frequency resource set includes K candidate time-frequency resource subsets, and the first time-frequency resource subset is one of the K candidate time-frequency resource subsets; and the first time-frequency resource set is related to a first antenna port, and the location relevant information of the UE is used for determining the first time-frequency resource subset from the K candidate time-frequency resource subsets.

The present disclosure provides a network equipment for wireless communication, wherein the network equipment includes:

a first transmitter module, to determine a first time-frequency resource subset from a first time-frequency resource set; and a second transmitter module, to transmit a first radio signal in the first time-frequency resource subset, or transmit a first radio signal in a second time-frequency resource subset.

Herein, the first time-frequency resource set includes the first time-frequency resource subset, a receiver of the first radio signal includes a first terminal, location relevant information of the first terminal is used for determining the first time-frequency resource subset from the first time-frequency resource set, and the first radio signal includes paging relevant information.

In one embodiment, the above network equipment for wireless communication is characterized in that: the first transmitter module further determines a second time-frequency resource subset; and the second time-frequency resource subset is unrelated to the location relevant information of the first terminal.

In one embodiment, the above network equipment for wireless communication is characterized in that: the first transmitter module further transmits first information, and the first information is used for determining the location relevant information of the first terminal.

In one embodiment, the above network equipment for wireless communication is characterized in that: the first transmitter module further transmits second information; the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the first terminal is related to a first list, and the first list is one of the K first-type lists; the location relevant information of the first terminal is used for determining the first list from the K first-type lists, and the first list is used for determining the first time-frequency resource subset from the K candidate time-frequency resource subsets.

In one embodiment, the above network equipment for wireless communication is characterized in that: the first time-frequency resource set corresponds to all time-frequency resources, used to transmit paging information, of the network equipment.

In one embodiment, the above network equipment for wireless communication is characterized in that: the first transmitter module further transmits third information; and the third information is used for determining at least the first time-frequency resource set in the first time-frequency resource set and the second time-frequency resource subset.

In one embodiment, the above network equipment for wireless communication is characterized in that: the first time-frequency resource set includes K candidate time-frequency resource subsets, and the first time-frequency resource subset is one of the K candidate time-frequency resource subsets; and the first time-frequency resource set is related to a first antenna port, and the location relevant information of the first terminal is used for determining the first time-frequency resource subset from the K candidate time-frequency resource subsets.

In one embodiment, the present disclosure has the following advantages compared with the conventional scheme.

A relationship is established between the location relevant information of the UE and the first time-frequency resource subset. The first time-frequency resource set corresponds to all time-frequency resources, used to transmit paging information, of one NTN base station. However, the UE only receives the paging information on partial time-frequency resources that are related to the location of the UE. The problem of paging collision caused by the NTN base station serving too many users is avoided.

The UE does not need to monitor paging information on all time-frequency resources, transmitting paging information, of one NTN base station. The power consumption of the UE is reduced.

The first time-frequency resource set is divided into K candidate time-frequency resource subsets, the first time-frequency resource subset is one of the K candidate time-frequency resource subsets, and the first time-frequency resource subset is related to the received location information of the UE; and, through the above method, the time-frequency resources, used to transmit paging information, in one NTN base station are grouped according to geographical locations of UEs, which improves the paging efficiency and is beneficial for the tracking of the UEs.

The second time-frequency resource subset is a fallback scheme for the first time-frequency resource subset, to ensure that the UE can still receive the paging information when not correctly acquiring the location relevant information.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
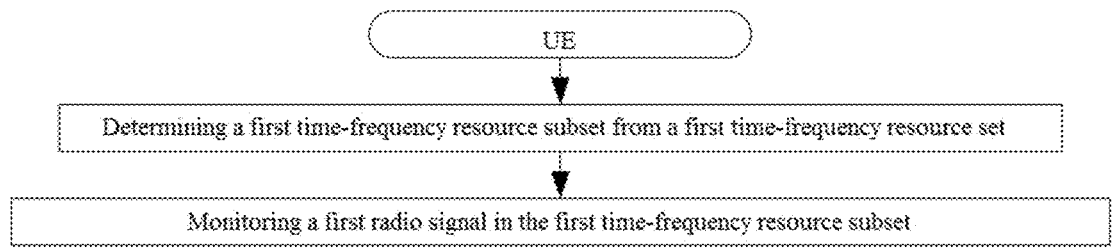
FIG. 1 is a flowchart of a first radio signal according to one embodiment of the present disclosure.

Embodiment 1 illustrates an example of a flowchart of a first radio signal, as shown in FIG. 1.

In Embodiment 1, the UE in the present disclosure first determines a first time-frequency resource subset from a first time-frequency resource set, and then monitors a first radio signal in the first time-frequency resource subset; location relevant information of the UE is used for determining the first time-frequency resource subset from the first time-frequency resource set, and the first radio signal includes paging relevant information.

In one subembodiment, the first time-frequency resource set includes K candidate time-frequency resource subsets, and the first time-frequency resource subset is one of the K candidate time-frequency resource subsets, wherein the K is a positive integer greater than 1.

In one subembodiment, the first time-frequency resource set includes Q1 REs, the first time-frequency resource subset includes Q2 REs, and the Q2 REs are a subset of the Q1 REs; and the RE occupies one subcarrier in frequency domain and one multicarrier symbol in time domain.

In one subembodiment, the location relevant information of the UE is related to at least one of the longitude of the UE and the latitude of the UE.

In one subembodiment, the location relevant information of the UE is related to an ID of a target base station.

In one affiliated embodiment of the above subembodiment, the ID of the target base station is a Tracking Area Code (TAC).

In one affiliated embodiment of the above subembodiment, the ID of the target base station is a Tracking Area Identity (TAI).

In one affiliated embodiment of the above subembodiment, the ID of the target base station is a Location Area Code (LAC).

In one affiliated embodiment of the above subembodiment, the ID of the target base station is a Location Area Identity (LAI).

In one affiliated embodiment of the above subembodiment, the ID of the target base station is a Cell Global Identity (CGI).

In one affiliated embodiment of the above subembodiment, the ID of the target base station is an eNB ID.

In one affiliated embodiment of the above subembodiment, the ID of the target base station is a Physical Cell Identity (PCI).

In one affiliated embodiment of the above subembodiment, the target base station is a terrestrial base station providing services for the UE.

In one affiliated embodiment of the above subembodiment, the UE keeps connected to both the target base station and a transmitter of the first radio signal simultaneously.

In an example of the affiliated embodiment, the transmitter of the first radio signal is an NTN base station.

In one affiliated embodiment of the above subembodiment, the target base station transmits the first radio signal.

In one subembodiment, the first radio signal includes Downlink Control Information (DCI), and the DCI is used for configuring the paging relevant information.

In one subembodiment, the first radio signal includes a Physical Downlink Shared Channel (PDSCH), and the PDSCH is used for transmitting the paging relevant information.

In one subembodiment, the first radio signal includes a Downlink Shared Channel (DL-SCH), and the DL-SCH is used for transmitting the paging relevant information.

In one subembodiment, a user ID of the UE is related to the first time-frequency resource subset.

In one affiliated embodiment of the above subembodiment, the user ID is at least one of SAE Temporary Mobile Subscriber Identity (S-TMSI) and IMSI, wherein the SAE represents System Architecture Evolution.

In one affiliated embodiment of the above subembodiment, the paging relevant information is transmitted in a target time unit set, wherein the target time unit set belongs to a time domain resource occupied by the first time-frequency resource subset, and the user ID is used for determining the target time unit set from the time domain resources occupied by the first time-frequency resource subset.

In an example of the affiliated embodiment, the target time unit set occupies a positive integer number of slots in time domain.

In one subembodiment, the NTN base station in the present disclosure is a base station located on one of GEO satellite, LEO satellite, HEO satellite and Airborne Platform.

In one subembodiment, a transmitter of the first radio signal determines autonomously positions of time-frequency resources occupied by the first time-frequency resource set.

Embodiment 2

Figure 2:
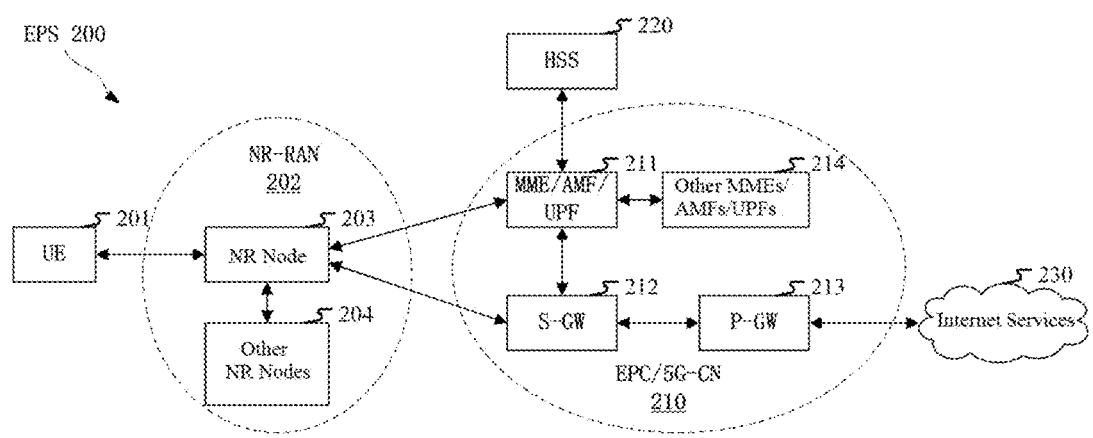
FIG. 2 is a diagram illustrating a network architecture according to one embodiment of the present disclosure.

Embodiment 2 illustrates an example of a diagram of a network architecture, as shown in FIG. 2.

Embodiment 2 illustrates an example of a diagram of a network architecture according to the present disclosure, as shown in FIG. 2. FIG. 2 is a diagram illustrating a network architecture 200 of NR 5G Long-Term Evolution (LTE), Long-Term Evolution Advanced (LTE-A) systems. The NR 5G or LTE network architecture 200 may be called an Evolved Packet System (EPS) 200 or some other appropriate terms. The EPS 200 may include one or more UEs 201, an NG-RAN 202, an Evolved Packet Core/5G-Core Network (EPC/5G-CN) 210, a Home Subscriber Server (HSS) 220 and an Internet Service 230. Herein, the EPS may be interconnected with other access networks. For simple description, the entities/interfaces are not shown. As shown in FIG. 2, the EPS provides packet switching services. Those skilled in the art are easy to understand that various concepts presented throughout the present disclosure may be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 or gNB 204 may be called a base station, a base transceiver station, a radio base station, a radio transceiver, a transceiver function, a Basic Service Set (BSS), an Extended Service Set (ESS), a Transmitter Receiver Point (TRP) or some other appropriate terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistants (PDAs), Satellite Radios, non-terrestrial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also may call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and Packet Switching Streaming Services (PSSs).

In one subembodiment, the UE 201 corresponds to the UE in the present disclosure.

In one subembodiment, the gNB 203 corresponds to the network equipment in the present disclosure.

In one subembodiment, the UE 201 supports NTN wireless communications.

In one subembodiment, the UE 201 accesses an NR 5G network through a satellite directly.

In one subembodiment, the first information in the present disclosure is generated by the MME, and is transmitted to the UE 201 through the gNB 203.

In one affiliated embodiment of the subembodiment, the first information is transparent to the gNB 203.

In one subembodiment, the second information in the present disclosure is generated by the MME, and is transmitted to the UE 201 through the gNB 203.

In one affiliated embodiment of the subembodiment, the second information is transparent to the gNB 203.

Embodiment 3

Figure 3:
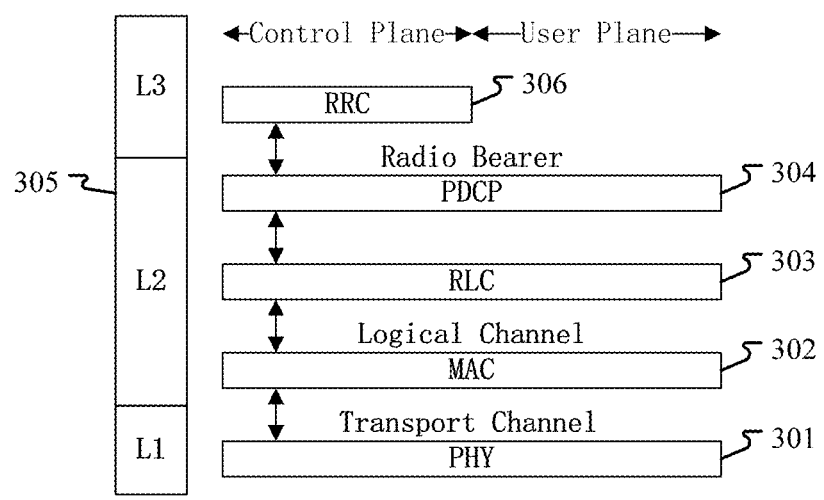
FIG. 3 is a diagram illustrating an embodiment of a radio protocol architecture of a user plane and a control plane according to one embodiment of the present disclosure.

Embodiment 3 illustrates a diagram of an embodiment of a radio protocol architecture of a user plane and a control plane according to the present disclosure, as shown in FIG. 3.

FIG. 3 is a diagram illustrating an embodiment of a radio protocol architecture of a user plane and a control plane. In FIG. 3, the radio protocol architecture of a UE and a base station device (gNB or eNB) is represented by three layers, which are a layer 1, a layer 2 and a layer 3 respectively. The layer 1 (L1) is the lowest layer and performs signal processing functions of various PHY layers. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may have several higher layers above the L2 305, including a network layer (i.e. IP layer) terminated at the P-GW of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce the radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the network equipment in the present disclosure.

In one subembodiment, the first information in the present disclosure is generated by the RRC sublayer 306.

In one subembodiment, the second information in the present disclosure is generated by the RRC sublayer 306.

In one subembodiment, at least one of the first information and the second information in the present disclosure is Non-access stratum (NAS) information.

Embodiment 4

Figure 4:
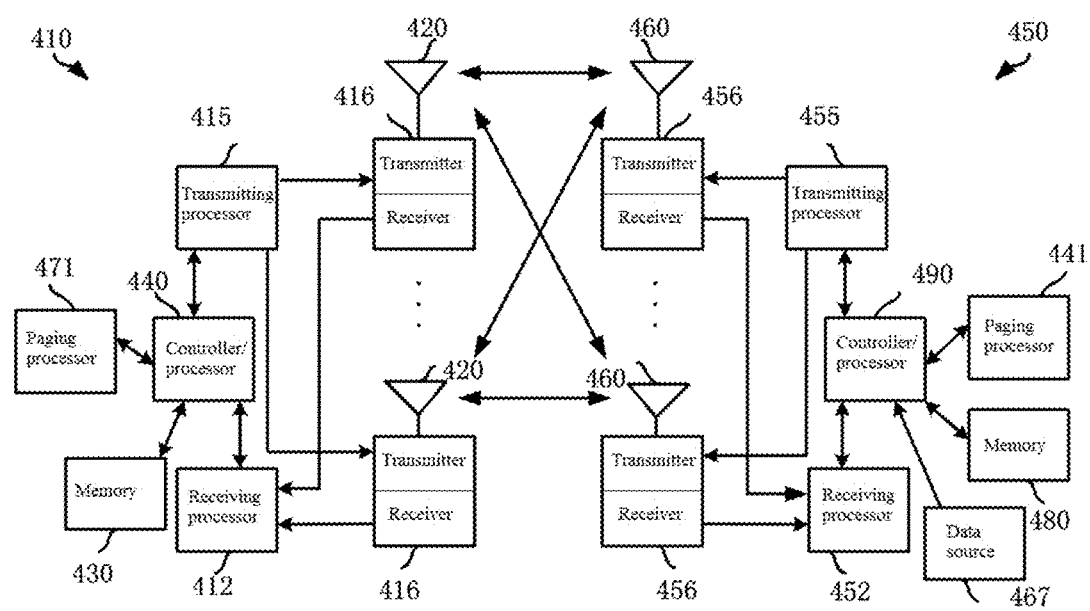
FIG. 4 is a diagram illustrating an evolved node B and a UE according to one embodiment of the present disclosure.

Embodiment 4 illustrates a diagram of a given base station device and a UE according to the present disclosure, as shown in FIG. 4. The network equipment in the present disclosure corresponds to the given base station device. FIG. 4 is a block diagram of a gNB 410 in communication with a UE 450 in an access network.

The base station device 410 includes a controller/processor 440, a memory 430, a receiving processor 412, a transmitting processor 415, a paging processor 471, a transmitter/receiver 416 and an antenna 420.

The UE 450 includes a controller/processor 490, a memory 480, a data source 467, a transmitting processor 455, a receiving processor 452, a paging processor 441, a transmitter/receiver 456 and an antenna 460.

In Downlink (DL) transmission, processes relevant to the base station device 410 include the following.

A packet from a higher layer is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The packet from a higher layer may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit for a transmission requirement, and the scheduling unit is configured to schedule an aerial resource corresponding to the transmission requirement.

The paging processor 471 determines at least one of {first information, second information}, and determines a first time-frequency resource set and a second time-frequency resource subset, and then transmits the result to the controller/processor 440.

The transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs signal receiving processing functions of an L1 layer (that is, PHY), including decoding, de-interleaving, descrambling, demodulation, extraction of physical layer control signaling, etc.

The paging processor 441 determines a first time-frequency resource subset from a first time-frequency resource set, and determines a second time-frequency resource subset, and transmits the result to the controller/processor 490.

The controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane.

The controller/processor 490 is connected to the memory 480 that stores program codes and data. The memory 480 may be a computer readable medium.

In one subembodiment, the UE 450 device includes at least one processor and at least one memory. The at least one memory includes computer program codes. The at least one memory and the computer program codes are configured to be used in collaboration with the at least one processor. The UE 450 at least determines a first time-frequency resource subset from a first time-frequency resource set, and monitors a first radio signal in the first time-frequency resource subset. Location relevant information of the UE 450 is used for determining the first time-frequency resource subset from the first time-frequency resource set, and the first radio signal includes paging relevant information.

In one subembodiment, the UE 450 includes a memory that stores a computer readable instruction program. The computer readable instruction program generates an action when executed by at least one processor. The action includes: determining a first time-frequency resource subset from a first time-frequency resource set, and monitoring a first radio signal in the first time-frequency resource subset. Location relevant information of the UE 450 is used for determining the first time-frequency resource subset from the first time-frequency resource set, and the first radio signal includes paging relevant information.

In one subembodiment, the gNB 410 device includes at least one processor and at least one memory. The at least one memory includes computer program codes. The at least one memory and the computer program codes are configured to be used in collaboration with the at least one processor. The gNB 410 at least determines a first time-frequency resource subset from a first time-frequency resource set, and transmits a first radio signal in the first time-frequency resource subset, or transmits a first radio signal in a second time-frequency resource subset. The first time-frequency resource set includes the first time-frequency resource subset, a receiver of the first radio signal includes the UE 450, location relevant information of the UE 450 is used for determining the first time-frequency resource subset from the first time-frequency resource set, and the first radio signal includes paging relevant information.

In one subembodiment, the gNB 410 includes a memory that stores a computer readable instruction program. The computer readable instruction program generates an action when executed by at least one processor. The action includes: determining a first time-frequency resource subset from a first time-frequency resource set, and transmitting a first radio signal in the first time-frequency resource subset, or transmitting a first radio signal in a second time-frequency resource subset. The first time-frequency resource set includes the first time-frequency resource subset, a receiver of the first radio signal includes the UE 450, location relevant information of the UE 450 is used for determining the first time-frequency resource subset from the first time-frequency resource set, and the first radio signal includes paging relevant information.

In one subembodiment, the UE 450 corresponds to the UE in the present disclosure.

In one subembodiment, the gNB 410 corresponds to the network equipment in the present disclosure.

In one subembodiment, at least the former two of the receiver 456, the receiving processor 452, and the controller/processor 490 are used for receiving at least one of the first information and the second information in the present disclosure.

In one subembodiment, at least the former two of the receiver 456, the receiving processor 452, and the controller/processor 490 are used for monitoring a first radio signal in a first time-frequency resource subset.

In one subembodiment, at least the former two of the receiver 456, the receiving processor 452, and the controller/processor 490 are used for monitoring a first radio signal in a second time-frequency resource subset.

In one subembodiment, at least one of the paging processor 441 and the controller/processor 490 is used for determining a first time-frequency resource subset from a first time-frequency resource set.

In one subembodiment, at least one of the paging processor 441 and the controller/processor 490 is used for determining a second time-frequency resource subset.

In one subembodiment, at least the former two of the transmitter 416, the transmitting processor 415, and the controller/processor 440 are used for transmitting at least one of the first information and the second information in the present disclosure.

In one subembodiment, at least the former two of the transmitter 416, the transmitting processor 415, and the controller/processor 440 are used for transmitting a first radio signal in a first time-frequency resource subset.

In one subembodiment, at least the former two of the transmitter 416, the transmitting processor 415, and the controller/processor 440 are used for transmitting a first radio signal in a second time-frequency resource subset.

In one subembodiment, at least one of the paging processor 471 and the controller/processor 440 is used for configuring at least the former one of a first time-frequency resource set and a first time-frequency resource subset}.

In one subembodiment, at least one of the paging processor 471 and the controller/processor 440 is used for determining a second time-frequency resource subset.

In one subembodiment, at least one of the paging processor 471 and the controller/processor 440 is used for determining at least one of first information and second information.

Embodiment 5

Figure 5:
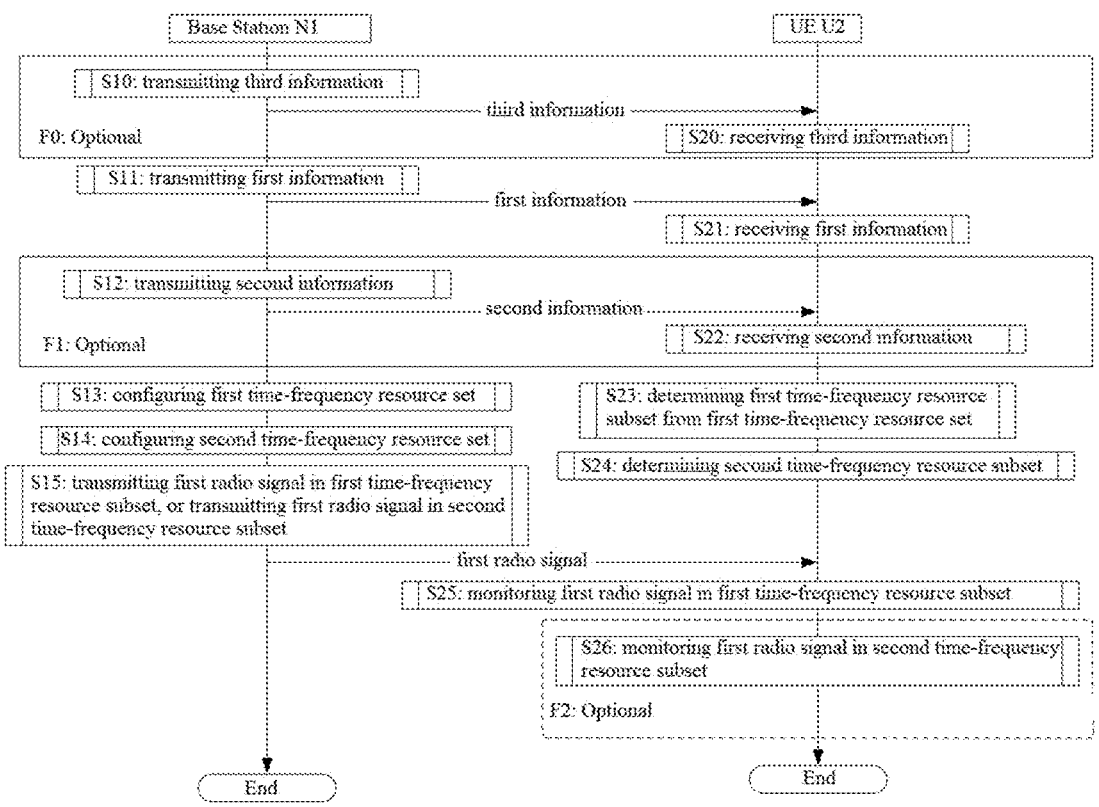
FIG. 5 is a flowchart of first information according to one embodiment of the present disclosure.

Embodiment 5 illustrates an example of a flowchart of first information, as shown in FIG. 5. In FIG. 5, the base station N1 is a maintenance base station for a serving cell of the UE U2. In FIG. 5, steps marked by F0, F1 and F2 are optional. The base station N1 corresponds to the network equipment in the present disclosure.

The base station N1 transmits third information in S10, transmits first information in S11, transmits second information in S12, determines a first time-frequency resource subset from a first time-frequency resource set in S13, determines a second time-frequency resource subset in S14, and transmits a first radio signal in the first time-frequency resource subset or transmits a first radio signal in the second time-frequency resource subset in S15.

The UE U2 receives third information in S20, receives first information in S21, receives second information in S22, determines first time-frequency resource subset from first time-frequency resource set in S23, determines second time-frequency resource subset in S24, monitors a first radio signal in the first time-frequency resource subset in S25, and monitors the first radio signal in the second time-frequency resource subset in S26.

In Embodiment 5, location relevant information of the UE U2 is used for determining the first time-frequency resource subset from the first time-frequency resource set, and the first radio signal includes paging relevant information; the second time-frequency resource subset is unrelated to the location relevant information of the UE U2; the first information is used for determining the location relevant information of the UE U2; the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the UE U2 is related to a first list, and the first list is one of the K first-type lists; the location relevant information of the UE U2 is used for determining the first list from the K first-type lists, and the first list is used for determining the first time-frequency resource subset from the K candidate time-frequency resource subsets; the first time-frequency resource set corresponds to all time-frequency resources, used to transmit paging information, of the base station N1; and the third information is used for determining at least the first time-frequency resource set in the first time-frequency resource set and the second time-frequency resource subset.

In one subembodiment, the second time-frequency resource subset belongs to the first time-frequency resource set.

In one subembodiment, time domain resources occupied by the second time-frequency resource subset are orthogonal to time domain resources occupied by the K candidate time-frequency resource subsets.

In one subembodiment, frequency domain resources occupied by the second time-frequency resource subset are orthogonal to frequency domain resources occupied by the K candidate time-frequency resource subsets.

In one subembodiment, the first radio signal includes all paging relevant information needed by the UE U2, the UE U2 does not detect the paging relevant information in the first time-frequency resource subset in a first time window, and the UE U2 monitors the first radio signal in the second time-frequency resource subset.

In one affiliated embodiment of the above subembodiment, the first time window includes a positive integer number of consecutive milliseconds.

In one affiliated embodiment of the above subembodiment, the duration of the first time window is fixed, or the duration of the first time window is configured through a higher layer signaling.

In one subembodiment, the second time-frequency resource subset is related to one of {IMSI, S-TMSI} of the UE U2.

In one subembodiment, the second time-frequency resource subset is related to the DRX configuration information of the UE U2.

In one subembodiment, the location relevant information is at least one of the longitude of the UE U2 and the latitude of the UE U2.

In one subembodiment, the first information is transmitted through the base station N1.

In one subembodiment, the first information is transmitted through the target base station in the present disclosure.

In one subembodiment, the first information includes at least one of TAC, TAI, CGI and PCID of the target base station in the present disclosure.

In one subembodiment, the first-type list includes M IDs, wherein the M is a positive integer.

In one affiliated embodiment of the above subembodiment, the ID is one of TAI, TAC, CGI and PCI.

In one affiliated embodiment of the above subembodiment, the M is equal to 1.

In one subembodiment, base stations corresponding to the first-type list are all NTN base stations.

In one subembodiment, an MME corresponding to the UE U2 transmits, through the base station N1, at least one of the first information and the second information to the UE U2.

In one affiliated embodiment of the above subembodiment, the first information is transparent to the base station N1.

In one affiliated embodiment of the above subembodiment, the second information is transparent to the base station N1.

In one subembodiment, the first time-frequency resource set being corresponding to all time-frequency resources, used to transmit paging information, of the base station N1 refers that: the base station N1 transmits paging relevant information in the first time-frequency resource set only, and the base station N1 does not transmit paging relevant information in time-frequency resources other than the first time-frequency resource set.

In one subembodiment, the first time-frequency resource set being corresponding to all time-frequency resources, used to transmit paging information, of the base station N1 refers that: all terminals served by the base station N1 monitor the paging relevant information coming from the base station N1 in the first time-frequency resource set only, and the all terminals do not monitor the paging relevant information coming from the base station N1 in time-frequency resources other than the first time-frequency resource set.

In one subembodiment, the first time-frequency resource set includes K candidate time-frequency resource subsets, and the first time-frequency resource subset is one of the K candidate time-frequency resource subsets; and the first time-frequency resource set is related to a first antenna port, and the location relevant information of the UE U2 is used for determining the first time-frequency resource subset from the K candidate time-frequency resource subsets.

In one affiliated embodiment of the above subembodiment, the base station N1 includes M1 first-type antenna ports, and the first antenna port is one of the M1 first-type antenna ports, wherein the M1 is a positive integer.

In an example of the affiliated embodiment, the M1 first-type antenna ports all correspond to the first time-frequency resource set.

In an example of the affiliated embodiment, the M1 first-type antenna ports correspond to M1 first-type time-frequency resource sets respectively, the first time-frequency resource set is one first-type time-frequency resource set in the M1 first-type time-frequency resource sets that is corresponding to the first antenna port.

In one affiliated embodiment of the above subembodiment, the first time-frequency resource set being related to a first antenna port refers that: time-frequency resources occupied by the paging relevant information transmitted via the first antenna port all belong to the first time-frequency resource set.

In one affiliated embodiment of the above subembodiment, the first time-frequency resource set being related to a first antenna port refers that: the UE U2 receives a given synchronization signal or a given broadcast signal on the first antenna port through given spatial RX parameters, and the UE U2 detects the paging relevant information for the UE U2 on the first time-frequency resource set through the given spatial RX parameters.

In one affiliated embodiment of the above subembodiment, the first antenna port corresponds to a Synchronization Signal Block (SSB) transmitted by one base station N1, or the first antenna port corresponds to a Channel State Information Reference Signal (CSI-RS).

In one subembodiment, the third information being used for determining at least the first time-frequency resource set in the first time-frequency resource set and the second time-frequency resource subset refers that: the third information is used for indicating positions of time-frequency resources occupied by the first time-frequency resource set.

In one subembodiment, the third information being used for determining at least the first time-frequency resource set in the first time-frequency resource set and the second time-frequency resource subset refers that: the third information is used for indicating positions of time-frequency resources occupied by any one of the K candidate time-frequency resource sets.

In one subembodiment, the third information being used for determining at least the first time-frequency resource set in the first time-frequency resource set and the second time-frequency resource subset refers that: the third information is used for indicating positions of time-frequency resources occupied by the second time-frequency resource subset.

In one subembodiment, the third information being used for determining at least the first time-frequency resource set in the first time-frequency resource set and the second time-frequency resource subset refers that: the third information is used for indicating time-frequency resources occupied by the second time-frequency resource subset and positions of the time-frequency resources occupied by the second time-frequency resource subset.

Embodiment 6

Figure 6:
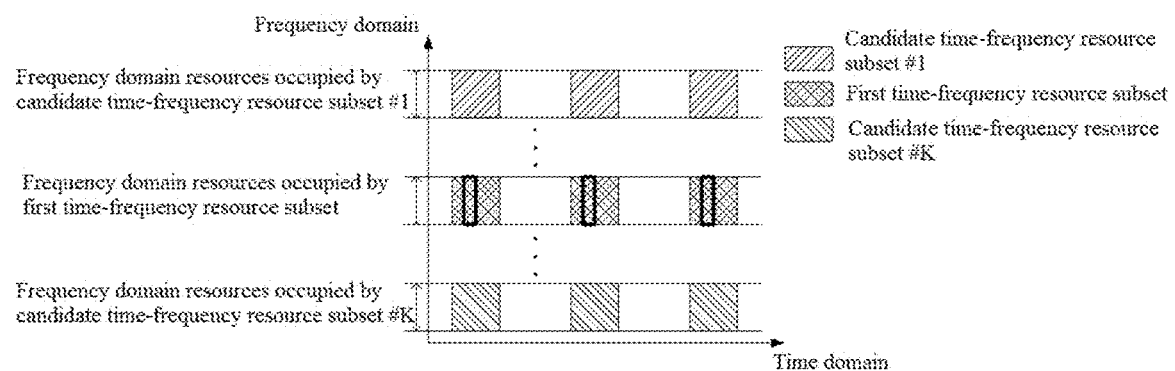
FIG. 6 is a diagram illustrating a relationship between a first time-frequency resource set and a first time-frequency resource subset according to one embodiment of the present disclosure.

Embodiment 6 illustrates a diagram of a relationship between a first time-frequency resource set and a first time-frequency resource subset, as shown in FIG. 6. In FIG. 6, the first time-frequency resource set includes K candidate time-frequency resource subsets, which correspond to a candidate time-frequency resource subset #1 to a candidate time-frequency resource subset #K respectively; the first time-frequency resource subset is one of the K candidate time-frequency resource subsets; the K candidate time-frequency resource subsets are orthogonal in frequency domain; the user ID in the present disclosure is used for determining a target time unit set from time domain resources corresponding to the first time-frequency resource subset, and the UE monitors the first radio signal in the present disclosure in the target time unit set; and the heavy-line block shown in FIG. 6 corresponds to the target time unit set.

In one subembodiment, the K candidate time-frequency resource subsets one-to-one correspond to the K first-type lists in the present disclosure respectively.

In one subembodiment, the first time-frequency resource subset occupies K1 second-type time windows in time domain, and the K1 second-type time windows are discrete in time domain.

In one affiliated embodiment of the above subembodiment, the second-type time window occupies K2 consecutive slots, and the duration of the K2 consecutive slots in time domain is equal to the DRX periodicity of the UE.

In an example of the affiliated embodiment, the UE only monitors the first radio signal in K3 slots of the K2 slots, and the user ID is used for determining the K3 slots from the K2 slots.

In a special case of the example, the K3 is equal to 1.

In a special case of the example, the K3 is a positive integer, and the K3 slots correspond to one PO of the user in the K2 slots.

Embodiment 7

Figure 7:
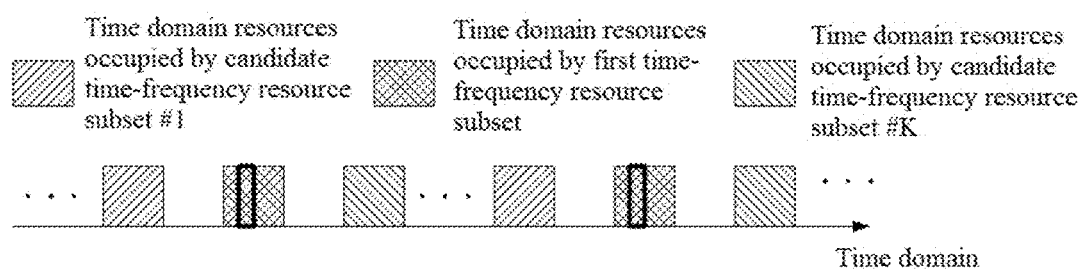
FIG. 7 is a diagram illustrating a relationship between a first time-frequency resource set and a first time-frequency resource subset according to another embodiment of the present disclosure.

Embodiment 7 illustrates a diagram of a relationship between a first time-frequency resource set and a first time-frequency resource subset, as shown in FIG. 7. In FIG. 7, the first time-frequency resource set includes K candidate time-frequency resource subsets, which correspond to a candidate time-frequency resource subset #1 to a candidate time-frequency resource subset #K respectively; the first time-frequency resource subset is one of the K candidate time-frequency resource subsets; the K candidate time-frequency resource subsets are orthogonal in time domain; the user ID in the present disclosure is used for determining a target time unit set from time domain resources corresponding to the first time-frequency resource subset, and the UE monitors the first radio signal in the present disclosure in the target time unit set; and the heavy-line block shown in FIG. 7 corresponds to the target time unit set.

In one subembodiment, the K candidate time-frequency resource subsets one-to-one correspond to the K first-type lists in the present disclosure respectively.

In one subembodiment, the first time-frequency resource subset occupies K1 second-type time windows in time domain, and the K1 second-type time windows are discrete in time domain.

In one affiliated embodiment of the above subembodiment, the second-type time window occupies K2 consecutive slots, and the duration of the K2 consecutive slots in time domain is equal to the DRX periodicity of the UE.

In an example of the affiliated embodiment, the UE only monitors the first radio signal in K3 slots of the K2 slots, and the user ID is used for determining the K3 slots from the K2 slots.

In a special case of the example, the K3 is equal to 1.

In a special case of the example, the K3 is a positive integer, and the K3 slots correspond to one PO of the user in the K2 slots.

Embodiment 8

Figure 8:
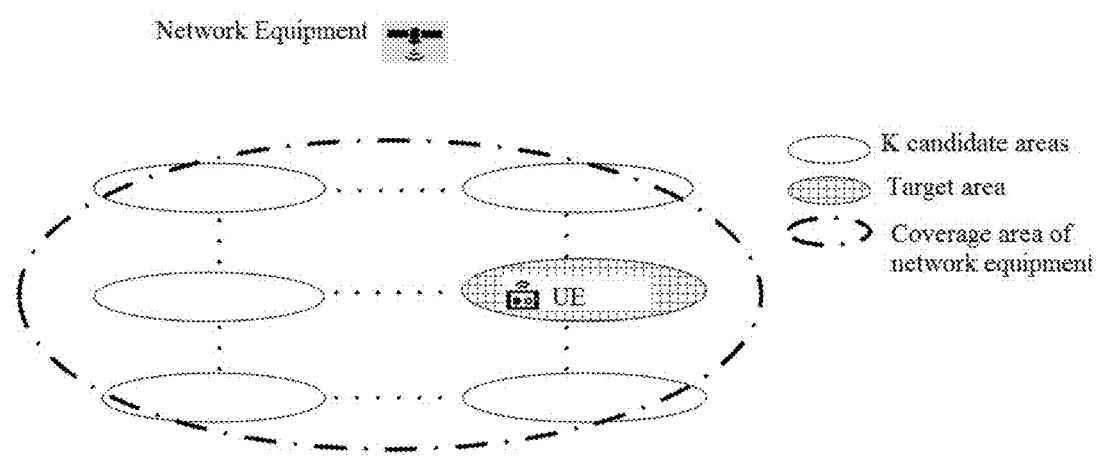
FIG. 8 is a diagram illustrating a UE, a network equipment, and location relevant information of the UE according to the present disclosure.

Embodiment 8 illustrates an example of a diagram of a UE, a network equipment, and location relevant information of the UE, as shown in FIG. 8. In FIG. 8, the network equipment is an NTN equipment, and the coverage area of the NTN equipment is divided into K candidate areas. The location relevant information of the UE is used for determining a target area (as shown in FIG. 8) where the UE is located from the K candidate areas, and the target area is one of the K candidate areas.

In one subembodiment, the K candidate areas one-to-one correspond to the K candidate time-frequency resource subsets in the present disclosure respectively, and the target area corresponds to the first time-frequency resource subset.

In one subembodiment, the K candidate areas one-to-one correspond to the K first-type lists in the present disclosure respectively, and the target area corresponds to the first list.

In one subembodiment, the candidate area corresponds to a Tracking Area (TA).

In one subembodiment, the candidate area corresponds to a TAC or a TAI.

In one subembodiment, the candidate area corresponds to the coverage area of a positive integer number of terrestrial base stations.

Embodiment 9

Figure 9:
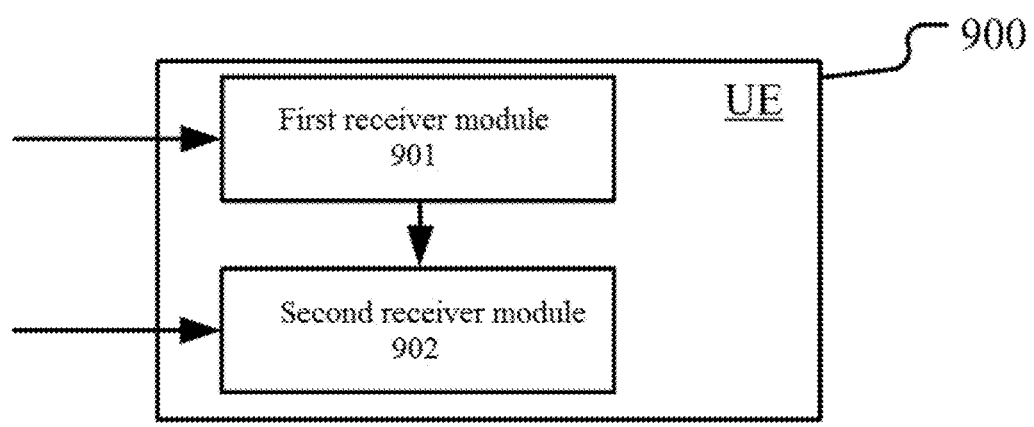
FIG. 9 is a structure block diagram illustrating a processing device in a UE according to one embodiment of the present disclosure.

Embodiment 9 illustrates an example of a structure block diagram of a processing device in a UE, as shown in FIG. 9. In FIG. 9, the processing device 900 of the UE is mainly composed of a first receiver module 901 and a second receiver module 902.

The first receiver module 901 determines a first time-frequency resource subset from a first time-frequency resource set.

The second receiver module 902 monitors a first radio signal in the first time-frequency resource subset.

In Embodiment 9, location relevant information of the UE is used for determining the first time-frequency resource subset from the first time-frequency resource set, and the first radio signal includes paging relevant information In one subembodiment, the first receiver module 901 further determines a second time-frequency resource subset, and the second receiver module 902 further monitors the first radio signal in the second time-frequency resource subset; and the second time-frequency resource subset is unrelated to the location relevant information of the UE.

In one subembodiment, the first receiver module 901 further receives first information, and the first information is used for determining the location relevant information of the UE.

In one subembodiment, the first receiver module 901 further receives second information; the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the UE is related to a first list, and the first list is one of the K first-type lists; the location relevant information of the UE is used for determining the first list from the K first-type lists, and the first list is used for determining the first time-frequency resource subset from the K candidate time-frequency resource subsets.

In one subembodiment, the first time-frequency resource set corresponds to all time-frequency resources, used to transmit paging information, of a transmitter of the first radio signal.

In one subembodiment, the first receiver module 901 further receives third information; and the third information is used for determining at least the first time-frequency resource set in the first time-frequency resource set and the second time-frequency resource subset.

In one subembodiment, the first time-frequency resource set includes K candidate time-frequency resource subsets, and the first time-frequency resource subset is one of the K candidate time-frequency resource subsets; and the first time-frequency resource set is related to a first antenna port, and the location relevant information of the UE is used for determining the first time-frequency resource subset from the K candidate time-frequency resource subsets.

In one subembodiment, the first receiver module 901 includes at least the former three of the receiver 456, the receiving processor 452, the paging processor 441 and the controller/processor 490 mentioned in Embodiment 4.

In one subembodiment, the second receiver module 902 includes at least the former two of the receiver 456, the receiving processor 452 and the controller/processor 490 mentioned in Embodiment 4.

Embodiment 10

Figure 10:
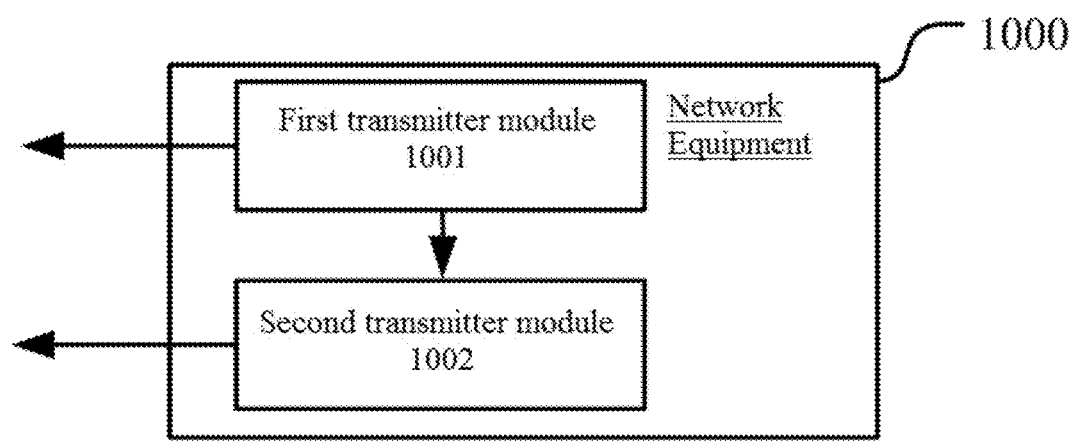
FIG. 10 is a structure block diagram illustrating a processing device in a network equipment according to one embodiment of the present disclosure.

Embodiment 10 illustrates an example of a structure block diagram of a processing device in a network equipment, as shown in FIG. 10. In FIG. 10, the processing device 1000 in the network equipment is mainly composed of a first transmitter module 1001 and a second transmitter module 1002.

The first transmitter module 1001 determines a first time-frequency resource subset from a first time-frequency resource set.

The second transmitter module 1002 transmits a first radio signal in the first time-frequency resource subset, or transmits a first radio signal in a second time-frequency resource subset.

In Embodiment 10, the first time-frequency resource set includes the first time-frequency resource subset, a receiver of the first radio signal includes a first terminal, location relevant information of the first terminal is used for determining the first time-frequency resource subset from the first time-frequency resource set, and the first radio signal includes paging relevant information.

In one subembodiment, the first transmitter module 1001 further determines a second time-frequency resource subset; and the second time-frequency resource subset is unrelated to the location relevant information of the first terminal.

In one subembodiment, the first transmitter module 1001 further transmits first information, and the first information is used for determining the location relevant information of the first terminal.

In one subembodiment, the first transmitter module 1001 further transmits second information; the second information indicates K first-type lists, the first time-frequency resource set includes K candidate time-frequency resource subsets, the first time-frequency resource subset is one of the K candidate time-frequency resource subsets, and the K first-type lists correspond to the K candidate time-frequency resource subsets respectively; the location relevant information of the first terminal is related to a first list, and the first list is one of the K first-type lists; the location relevant information of the first terminal is used for determining the first list from the K first-type lists, and the first list is used for determining the first time-frequency resource subset from the K candidate time-frequency resource subsets.

In one subembodiment, the first time-frequency resource set corresponds to all time-frequency resources, used to transmit paging information, of the network equipment.

In one subembodiment, the first transmitter module 1001 further transmits third information; and the third information is used for determining at least the first time-frequency resource set in the first time-frequency resource set and the second time-frequency resource subset.

In one subembodiment, the first time-frequency resource set includes K candidate time-frequency resource subsets, and the first time-frequency resource subset is one of the K candidate time-frequency resource subsets; and the first time-frequency resource set is related to a first antenna port, and the location relevant information of the first terminal is used for determining the first time-frequency resource subset from the K candidate time-frequency resource subsets.

In one subembodiment, the first transmitter module 1001 includes at least the former three of the transmitter 416, the transmitting processor 415, the paging processor 471 and the controller/processor 440 mentioned in Embodiment 4.

In one subembodiment, the second transmitter module 1002 includes at least the former two of the transmitter 416, the transmitting processor 415 and the controller/processor 440 mentioned in Embodiment 4.

In one subembodiment, the first transmitter module 1001 acquires the first information from an MME, and transmits the first information to the first terminal.

In one affiliated embodiment of the above subembodiment, the first information is transparent to the network equipment 1000.

In one affiliated embodiment of the above subembodiment, the network equipment 1000 is a maintenance base station for a serving cell of the first terminal.

In one subembodiment, the first transmitter module 1001 acquires the second information from the MME, and transmits the first information to the first terminal.

In one affiliated embodiment of the above subembodiment, the second information is transparent to the network equipment 1000.

In one affiliated embodiment of the above subembodiment, the network equipment 1000 is a maintenance base station for a serving cell of the first terminal.

Embodiment 11

Figure 11:
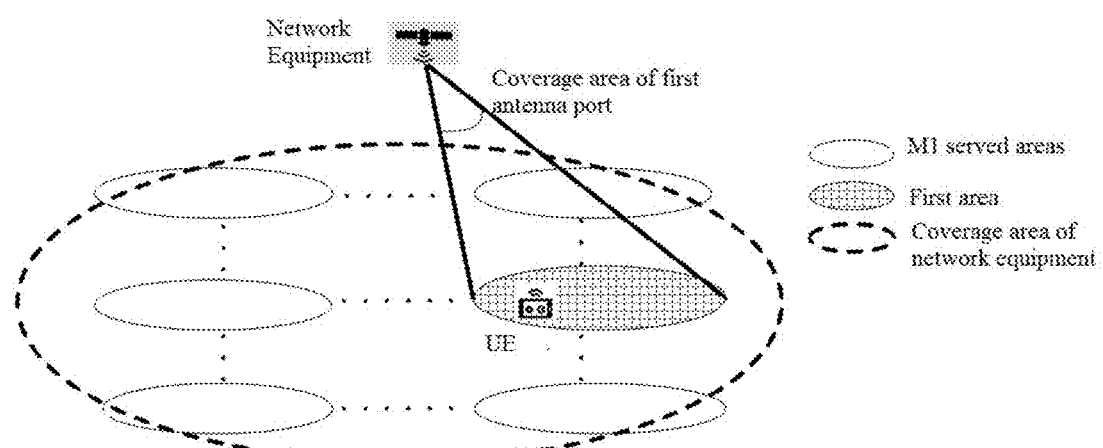
FIG. 11 is a diagram illustrating a relationship between a first antenna port and a first time-frequency resource set according to one embodiment of the present disclosure.

Embodiment 11 illustrates an example of a diagram of a relationship between a first antenna port and a first time-frequency resource set, as shown in FIG. 11. In FIG. 11, the network equipment is an NTN equipment, the NTN equipment includes M1 first-type antenna ports, and the first antenna port is one of the M1 first-type antenna ports; the M1 first-type antenna ports cover M1 served regions respectively; the coverage region of the first antenna port is a first region in the M1 served regions, and the first region is further divided into the K candidate areas mentioned in Embodiment 8; and the M1 and the K are both positive integers.

In one subembodiment, the UE receives a given SSB or a given broadcast signal on the first antenna port through given spatial RX parameters, and the UE detects paging relevant information on the first time-frequency resource set through the given spatial RX parameters.

In one subembodiment, a given first-type antenna port is any one first-type antenna port of the M1 first-type antenna ports, the given first-type antenna port covers a given served region, and the base station transmits, in the first time-frequency resource set, paging relevant information targeting all terminals in the given served region via the given first-type antenna port.

In one subembodiment, paging relevant information of all terminal devices in the M1 served regions is transmitted in the first time-frequency resource set.

In one subembodiment, the UE determines the first region from the M1 served regions according to the first antenna port.

In one subembodiment, the UE determines the target area from the K candidate areas according to the location relevant information, and then determines the first time-frequency resource subset from the first time-frequency resource set according to the index of the target area in the K candidate areas.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base stations, gNBs (NR nodes B), TRPs, satellite base stations, airborne platform base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving first information;
   receiving second information;
   determining a first time-frequency resource subset from a first time-frequency resource set; and
   monitoring a first radio signal in the first time-frequency resource subset;
   wherein location relevant information of the UE is used for determining the first time-frequency resource subset from the first time-frequency resource set, and the first radio signal comprises paging relevant information; and the first time-frequency resource set corresponds to all time-frequency resources, used to transmit paging information, of a transmitter of the first radio signal; the first information is transmitted through the target base station, the first information is used for determining the location relevant information of the UE; the location relevant information of the UE is a Tracking Area Code of the target base station, or a Tracking Area Identity of the target base station; the target base station being a terrestrial base station providing services for the UE; the transmitter of the first radio signal is an Non-Terrestrial Networks base station; the target base station and the Non-Terrestrial Networks base station are different; the second information indicates K first-type lists, the first time-frequency resource set comprises K candidate time-frequency resource subsets, the first time-frequency resource subset is one of the K candidate time-frequency resource subsets, and the K first-type lists correspond to the K candidate time-frequency resource subsets respectively; the location relevant information of the UE is related to a first list, and the first list is one of the K first-type lists; the location relevant information of the UE is used by the UE for determining the first list from the K first-type lists, and the first list is used by the UE for determining the first time-frequency resource subset from the K candidate time-frequency resource subsets.

2. The method according to claim 1, further comprising: determining a second time-frequency resource subset; and monitoring the first radio signal in the second time-frequency resource subset;
wherein the second time-frequency resource subset is unrelated to the location relevant information of the UE.

3. The method according to claim 1, wherein a coverage area of the Non-Terrestrial base station is divided into K candidate areas, the UE is in a target area, the target area is one of the K candidate areas; the K candidate areas one-to-one correspond to the K first-type lists, each candidate area corresponds to a TAC or a TAI; the target area is used for determining the first list from the K first-type lists.

4. The method according to claim 1, further comprising: receiving third information;
wherein the third information is used for determining the first time-frequency resource set.

5. The method according to claim 1, wherein the first time-frequency resource set comprises K candidate time-frequency resource subsets, and the first time-frequency resource subset is one of the K candidate time-frequency resource subsets; and the first time-frequency resource set is related to a first antenna port, and the location relevant information of the UE is used for determining the first time-frequency resource subset from the K candidate time-frequency resource subsets.

6. A method in a network equipment for wireless communication, comprising:
transmitting second information;
determining a first time-frequency resource subset from a first time-frequency resource set; and
transmitting a first radio signal in the first time-frequency resource subset, or transmitting a first radio signal in a second time-frequency resource subset;
wherein the first time-frequency resource set comprises the first time-frequency resource subset, a receiver of the first radio signal comprises a first terminal, location relevant information of the first terminal is used by the first terminal for determining the first time-frequency resource subset from the first time-frequency resource set, and the first radio signal comprises paging relevant information; and the first time-frequency resource set corresponds to all time-frequency resources, used to transmit paging information, of the network equipment; first information is transmitted through a target base station, the first information is used for determining the location relevant information of the first terminal; the location relevant information of the first terminal is a Tracking Area Code of the target base station, or a Tracking Area Identity of the target base station; the target base station being a terrestrial base station providing services for the first terminal; the network equipment is an Non-Terrestrial Networks base station; the target base station and the Non-Terrestrial Networks base station are different the second information indicates K first-type lists, the first time-frequency resource set comprises K candidate time-frequency resource subsets, the first time-frequency resource subset is one of the K candidate time-frequency resource subsets, and the K first-type lists correspond to the K candidate time-frequency resource subsets respectively; the location relevant information of the first terminal is related to a first list, and the first list is one of the K first-type lists; the location relevant information of the first terminal is used by the first terminal for determining the first list from the K first-type lists, and the first list is used by the first terminal for determining the first time-frequency resource subset from the K candidate time-frequency resource subsets.

7. The method according to claim 6, further comprising: determining a second time-frequency resource subset; and
wherein the second time-frequency resource subset is unrelated to the location relevant information of the first terminal.

8. The method according to claim 6, wherein a coverage area of the network equipment is divided into K candidate areas, the first terminal is in a target area, the target area is one of the K candidate areas; the K candidate areas one-to-one correspond to the K first-type lists, each candidate area corresponds to a TAC or a TAI; the target area is used for determining the first list from the K first-type lists.

9. The method according to claim 6, further comprising: transmitting third information;
wherein the third information is used for determining the first time-frequency resource set.

10. The method according to claim 6, wherein the first time-frequency resource set comprises K candidate time-frequency resource subsets, and the first time-frequency resource subset is one of the K candidate time-frequency resource subsets; and the first time-frequency resource set is related to a first antenna port, and the location relevant information of the first terminal is used for determining the first time-frequency resource subset from the K candidate time-frequency resource subsets.

11. A UE for wireless communication, comprising:
a first receiver module, to receives first information, to receive second information, to determine a first time-frequency resource subset from a first time-frequency resource set; and
a second receiver module, to monitor a first radio signal in the first time-frequency resource sub set;
wherein location relevant information of the UE is used for determining the first time-frequency resource subset from the first time-frequency resource set, and the first radio signal comprises paging relevant information; and the first time-frequency resource set corresponds to all time-frequency resources, used to transmit paging information, of a transmitter of the first radio signal; the first information is transmitted through the target base station, the first information is used for determining the location relevant information of the UE; the location relevant information of the UE is a Tracking Area Code of the target base station, or a Tracking Area Identity of the target base station; the target base station being a terrestrial base station providing services for the UE; the transmitter of the first radio signal is an Non-Terrestrial Networks base station; the target base station and the Non-Terrestrial Networks base station are different the second information indicates K first-type lists, the first time-frequency resource set comprises K candidate time-frequency resource subsets, the first time-frequency resource subset is one of the K candidate time-frequency resource subsets, and the K first-type lists correspond to the K candidate time-frequency resource subsets respectively; the location relevant information of the UE is related to a first list, and the first list is one of the K first-type lists; the location relevant information of the UE is used by the UE for determining the first list from the K first-type lists, and the first list is used by the UE for determining the first time-frequency resource subset from the K candidate time-frequency resource subsets.

12. The UE according to claim 11, wherein the first receiver module further determines a second time-frequency resource subset, and the second receiver module further monitors the first radio signal in the second time-frequency resource subset; and the second time-frequency resource subset is unrelated to the location relevant information of the UE.

13. The UE according to claim 11, wherein a coverage area of the Non-Terrestrial base station is divided into K candidate areas, the UE is in a target area, the target area is one of the K candidate areas; the K candidate areas one-to-one correspond to the K first-type lists, each candidate area corresponds to a TAC or a TAI; the target area is used for determining the first list from the K first-type lists.

14. The UE according to claim 11, wherein the first receiver module further receives third information; the third information is used for determining the first time-frequency resource set.

15. The UE according to claim 11, wherein the first time-frequency resource set comprises K candidate time-frequency resource subsets, and the first time-frequency resource subset is one of the K candidate time-frequency resource subsets; and the first time-frequency resource set is related to a first antenna port, and the location relevant information of the UE is used for determining the first time-frequency resource subset from the K candidate time-frequency resource subsets.

16. A network equipment for wireless communication, comprising:
a first transmitter module, to transmit second information, to determine a first time-frequency resource subset from a first time-frequency resource set; and
a second transmitter module, to transmit a first radio signal in the first time-frequency resource subset, or transmit a first radio signal in a second time-frequency resource subset;
wherein the first time-frequency resource set comprises the first time-frequency resource subset, a receiver of the first radio signal comprises a first terminal, location relevant information of the first terminal is used for determining the first time-frequency resource subset from the first time-frequency resource set, and the first radio signal comprises paging relevant information; and the first time-frequency resource set corresponds to all time-frequency resources, used to transmit paging information, of the network equipment; first information is transmitted through a target base station, the first information is used for determining the location relevant information of the first terminal; the location relevant information of the first terminal is a Tracking Area Code of the target base station, or a Tracking Area Identity of the target base station; the target base station is a terrestrial base station providing services for the first terminal; the target base station is a terrestrial base station providing services for the first terminal; the network equipment is an Non-Terrestrial Networks base station; the target base station and the Non-Terrestrial Networks base station are different the second information indicates K first-type lists, the first time-frequency resource set comprises K candidate time-frequency resource subsets, the first time-frequency resource subset is one of the K candidate time-frequency resource subsets, and the K first-type lists correspond to the K candidate time-frequency resource subsets respectively; the location relevant information of the first terminal is related to a first list, and the first list is one of the K first-type lists; the location relevant information of the first terminal is used by the first terminal for determining the first list from the K first-type lists, and the first list is used by the first terminal for determining the first time-frequency resource subset from the K candidate time-frequency resource subsets.

17. The network equipment according to claim 16, wherein the first transmitter module further determines a second time-frequency resource subset; and the second time-frequency resource subset is unrelated to the location relevant information of the first terminal.

18. The network equipment according to claim 16, wherein a coverage area of the network equipment is divided into K candidate areas, the first terminal is in a target area, the target area is one of the K candidate areas; the K candidate areas one-to-one correspond to the K first-type lists, each candidate area corresponds to a TAC or a TAI; the target area is used for determining the first list from the K first-type lists.

19. The network equipment according to claim 16, wherein the first transmitter module further transmits third information; the third information is used for determining the first time-frequency resource set.

20. The network equipment according to claim 16, wherein the first time-frequency resource set comprises K candidate time-frequency resource subsets, and the first time-frequency resource subset is one of the K candidate time-frequency resource subsets; and the first time-frequency resource set is related to a first antenna port, and the location relevant information of the first terminal is used for determining the first time-frequency resource subset from the K candidate time-frequency resource subsets.

* * * * *